US007897530B2

(12) United States Patent
Liu et al.

(10) Patent No.: US 7,897,530 B2
(45) Date of Patent: Mar. 1, 2011

(54) GLASS-CERAMIC SEALANT FOR PLANAR SOLID OXIDE FUEL CELLS

(75) Inventors: Chien-Kuo Liu, Miaoli County (TW); Tung-Yuan Yung, Taoyuan County (TW); Kin-Fu Lin, Taipei (TW); Ruey-Yi Lee, Taoyuan County (TW); Tzang-Sheng Lee, Taipei (TW)

(73) Assignee: Atomic Energy Council-Institute of Nuclear Energy Research, Taoyuan (TW)

( * ) Notice: Subject to any disclaimer, the term of this patent is extended or adjusted under 35 U.S.C. 154(b) by 27 days.

(21) Appl. No.: 12/007,696

(22) Filed: Jan. 14, 2008

(65) Prior Publication Data

US 2010/0184580 A1 Jul. 22, 2010

(51) Int. Cl.
*C03C 8/24* (2006.01)
*C03C 3/068* (2006.01)

(52) U.S. Cl. .............................. 501/15; 501/17; 501/78

(58) Field of Classification Search .................. 501/15, 501/17, 78

See application file for complete search history.

(56) References Cited

U.S. PATENT DOCUMENTS 4,965,229 A * 10/1990 Nishino et al. ................ 501/14
5,057,378 A * 10/1991 Nishino et al. .............. 428/457
5,648,302 A * 7/1997 Brow et al. .................. 501/50
6,430,966 B1 * 8/2002 Meinhardt et al. ............. 65/43
6,532,769 B1 * 3/2003 Meinhardt et al. ........... 65/33.5
6,534,346 B2 * 3/2003 Kosokabe ................... 438/127
7,189,668 B2 * 3/2007 Budd ............................ 501/5
7,399,720 B1 * 7/2008 Brow et al. .................. 501/17
7,470,640 B2 * 12/2008 Badding et al. ................ 501/5
2005/0130823 A1 * 6/2005 Budd ............................ 501/5
2005/0181927 A1 * 8/2005 Hasegawa et al. ............. 501/79
2006/0172875 A1 * 8/2006 Cortright et al. .............. 501/15
2009/0061282 A1 * 3/2009 Wu et al. ...................... 429/36

FOREIGN PATENT DOCUMENTS

JP 77000966 * 1/1977
JP 63218525 * 9/1988
JP 03080126 * 4/1991
KR 693938 * 3/2007

* cited by examiner

*Primary Examiner*—Karl E Group
(74) *Attorney, Agent, or Firm*—Jackson IPG PLLC; Demian K. Jackson

(57) ABSTRACT

Glass-ceramic sealant is disclosed for planar solid oxide fuel cells. The glass-ceramic sealant includes 0 to 40 mol % of silicon oxide, 0 to 15 mol % boron oxide, 0 to 10 mol % of aluminum oxide, 0 to 40 mol % of barium oxide, 0 to 15 mol % of calcium oxide, 0 to 15 mol % of lanthanum oxide and 0 to 5 mol % of zirconium dioxide. At 0° C. to 600° C., the thermal expansion coefficient of the sealant is 8 to 10 ppm/° C.

4 Claims, 2 Drawing Sheets

GLASS-CERAMIC SEALANT FOR PLANAR SOLID OXIDE FUEL CELLS

BACKGROUND OF INVENTION

1. Field of Invention

The present invention relates to planar solid oxide fuel cells and, more particularly, to glass-ceramic sealant for planar solid oxide fuel cells.

2. Related Prior Art

Solid oxide fuel cells are high-temperature fuel cells of high generation efficiencies. Among the solid fuel cells, planar solid oxide fuel cells include the simplest structures, provide the highest generation efficiencies and involve the lowest working temperatures. Therefore, the planar solid oxide fuel cells are the focus of the research and development of solid oxide fuel cells.

A planar solid oxide fuel cell includes a PEN and an anode, a cathode, a solid electrolyte and a bi-polar inter-connector stacked on one another. The anode, the cathode and the solid electrolyte together are called the "PEN." The anode, the cathode and the solid electrolyte are made of ceramics. The bi-polar inter-connector is made of stainless steel. These components of the planar solid oxide fuel cell are joined together by sealant. The thermal expansion coefficients of the sealant are very different from the thermal expansion coefficients of the components. The temperature differs from point to point in the sealant and the components. Hence, there is considerable thermal stress in the planar solid oxide fuel cell. Such thermal stress might cause the sealant to crack and the components to peel from one another. The components might be exposed and/or damaged. The generation efficiency of the planar solid oxide fuel cell might be reduced. In the worst scenario, the planar solid oxide fuel cell might be out of order.

The present invention is therefore intended to obviate or at least alleviate the problems encountered in prior art.

SUMMARY OF INVENTION

The primary objective of the present invention is to provide glass-ceramic sealant for planar solid oxide fuel cells.

To achieve the foregoing objective the Glass-ceramic sealant is disclosed for planar solid oxide fuel cells. The glass-ceramic sealant includes 0 to 40 mol % of silicon oxide, 0 to 15 mol % boron oxide, 0 to 10 mol % of aluminum oxide, 0 to 40 mol % of barium oxide, 0 to 15 mol % of calcium oxide, 0 to 15 mol % of lanthanum oxide and 0 to 5 mol % of zirconium dioxide. At 0° C. to 600° C., the thermal expansion coefficient of the sealant is 8 to 10 ppm/° C.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 1:
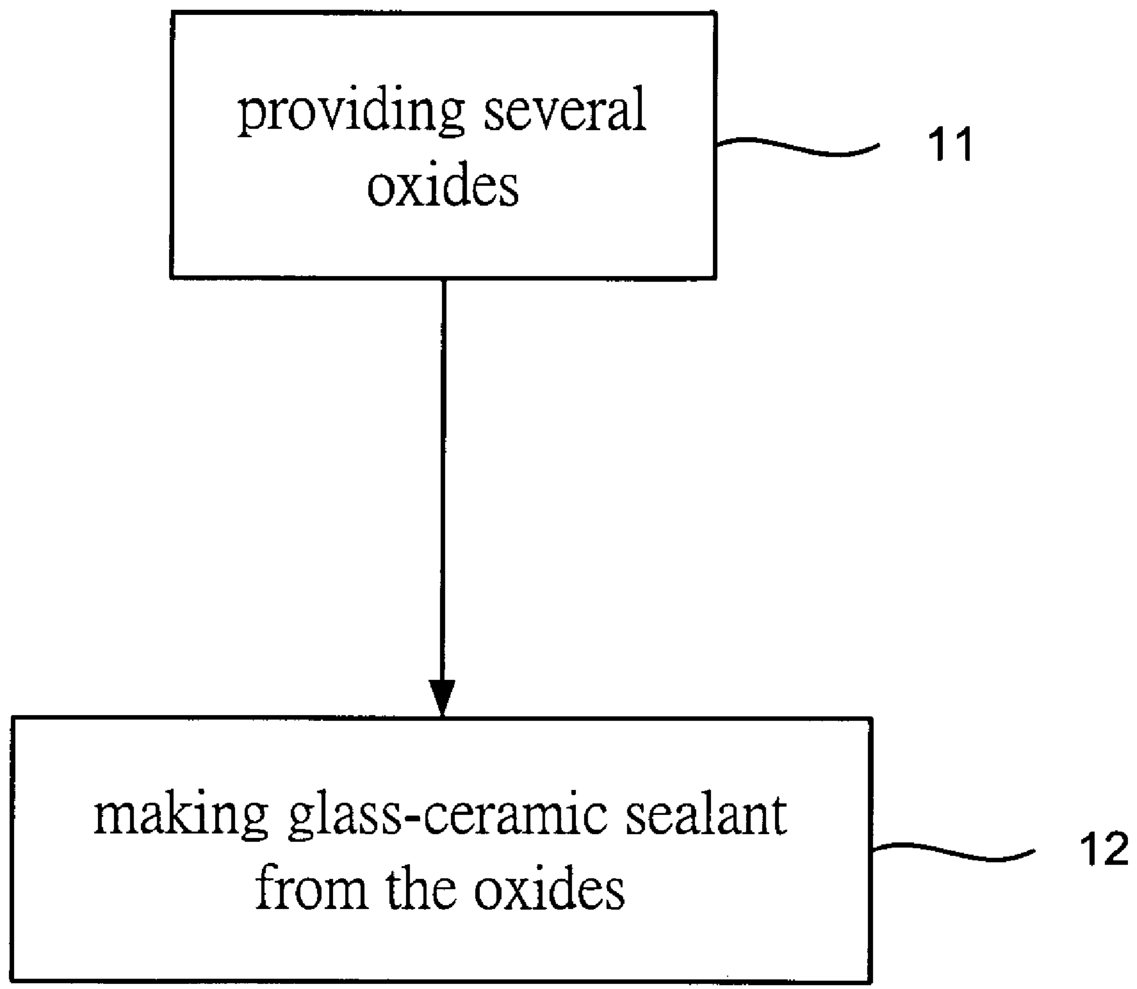
FIG. 1 is a flow chart of a method for making glass-ceramic sealant for planar solid oxide fuel cells according to the preferred embodiment of the present invention.

Referring to FIG. 1, there is shown a method for making glass-ceramic sealant for solid oxide fuel cells according to the preferred embodiment of the present invention.

At 11, a mixture is provided with 34 mol % of silicon oxide, 9.5 mol % of boron oxide, 4.5 mol % of aluminum oxide, 34 mol % of barium oxide, 12 mol % of calcium oxide, 5 mol % of lanthanum oxide and 1 mol % of zirconium dioxide.

At 12, the mixture is disposed in a crucible and heated in a furnace. The temperature is raised to 500° C. at a temperature gradient of 5° C./min.

The temperature is retained at 500° C. for 1 hour. Then, the temperature is raised to 1550° C. at the same temperature gradient. The temperature is retained at 1550° C. for at least 10 hours so that liquid of molten glass is provided. The molten glass is quenched to the zoom temperature and turned into sealant for planar solid oxide fuel cells.

Alternatively, the liquid of molten glass may be quenched to the annealing point for at least 10 hours. Finally, the liquid of molten glass is slowly cooled to the zoom temperature, thus removing residual stress that would otherwise exist therein.

Figure 2:
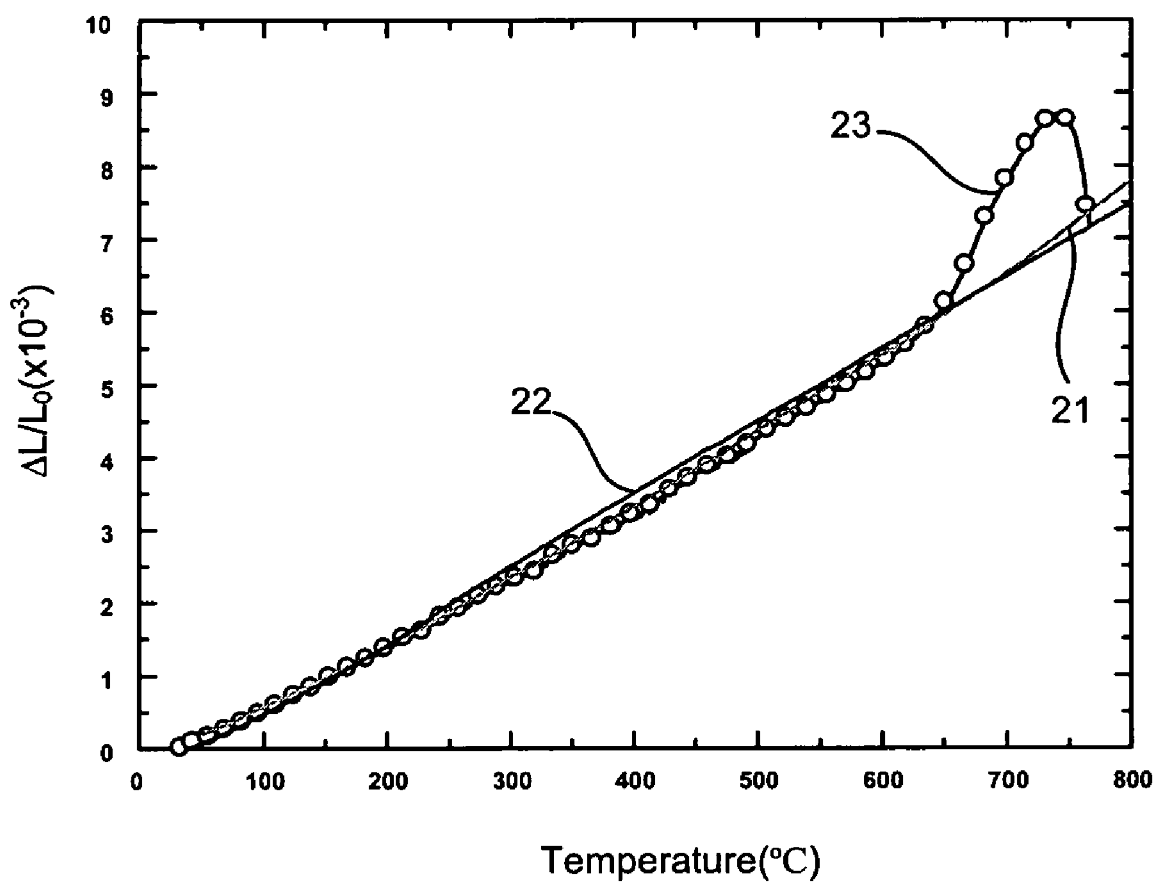
FIG. 2 is chart of thermal expansion coefficients vs. temperature of the glass-ceramic sealant made according to the method shown in FIG. 1.

Referring to FIG. 2, the thermal expansion coefficient of a high-chromium stainless steel bi-polar inter-connector is shown in a line 21. The thermal expansion coefficient of the high-chromium stainless steel bi-polar inter-connector is about 11.0 ppm/° C. The thermal expansion coefficient of a PEN is shown in a line 22. The thermal expansion coefficient of a PEN is about 10.2 ppm/° C. The thermal expansion coefficient of the sealant is shown in a line 23. The thermal expansion coefficient of the sealant is about 10 ppm/° C. The transition point of the sealant is 625° C. while the softening point is 745° C.

As discussed, the thermal expansion coefficient of the sealant is close to those of the high-chromium stainless steel bi-polar inter-connector and the PEN. When the sealant is used to seal the high-chromium stainless steel bi-polar inter-connector and the PEN to provide a planar solid oxide fuel cell, there will be only a small amount of thermal stress in the planar solid oxide fuel cell in operation. Hence, the sealant provides excellent air-tightness and isolation.

According to the present invention, the sealant includes 0 to 40 mol % of silicon oxide, 0 to 15 mol % boron oxide, 0 to 10 mol % of aluminum oxide, 0 to 40 mol % of barium oxide, 0 to 15 mol % of calcium oxide, 0 to 15 mol % of lanthanum oxide and 0 to 5 mol % of zirconium dioxide. At 0° C. to 600° C., the thermal expansion coefficient of the sealant is 8 to 10 ppm/° C. The softening point of the sealant is 680° C. to 750° C. The sealant can be provided between two metal layers or two ceramic layers or between a metal layer and a ceramic layer. The sealant can be used for planar solid oxide fuel cells for air-tightness and sealing.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A glass-ceramic sealant consisting essentially of 34 mol % of silicon oxide, 9.5 mol % boron oxide, 4.5 mol % aluminum oxide, 34 mol % barium oxide, 12 mol % calcium oxide, 5 mol % lanthanum oxide, and 1 mol % zirconium dioxide.

2. The glass-ceramic sealant according to claim 1, wherein the thermal expansion coefficient of the sealant is 8 to 10 ppm/° C. at 0° C. to 600° C.

3. The glass-ceramic sealant according to claim 1, wherein the softening point of the sealant is 680° C. to 750° C.

4. The glass-ceramic sealant according to claim 1, wherein the sealant has a coefficient of thermal expansion within 1 ppm/° C. of coefficients of thermal expansion of one or both of a metal layer and a ceramic layer adjacent the glass-ceramic sealant.

* * * * *